Feb. 18, 1941.   F. H. ADAMS   2,231,865
HOBBING MACHINE
Filed June 5, 1934   4 Sheets-Sheet 1

INVENTOR
FRANK H. ADAMS
Kwis, Hudson & Kent.
ATTORNEYS

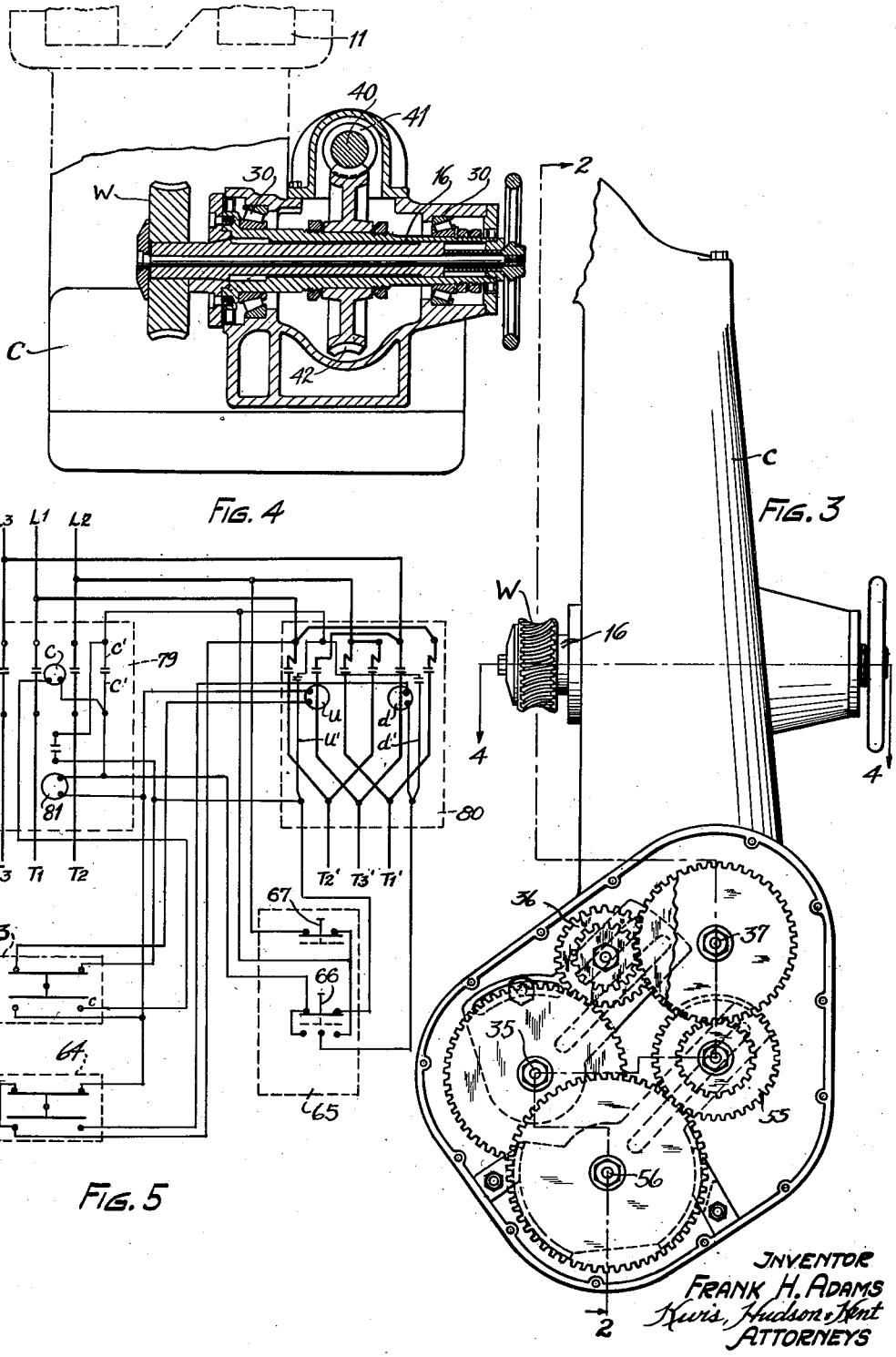

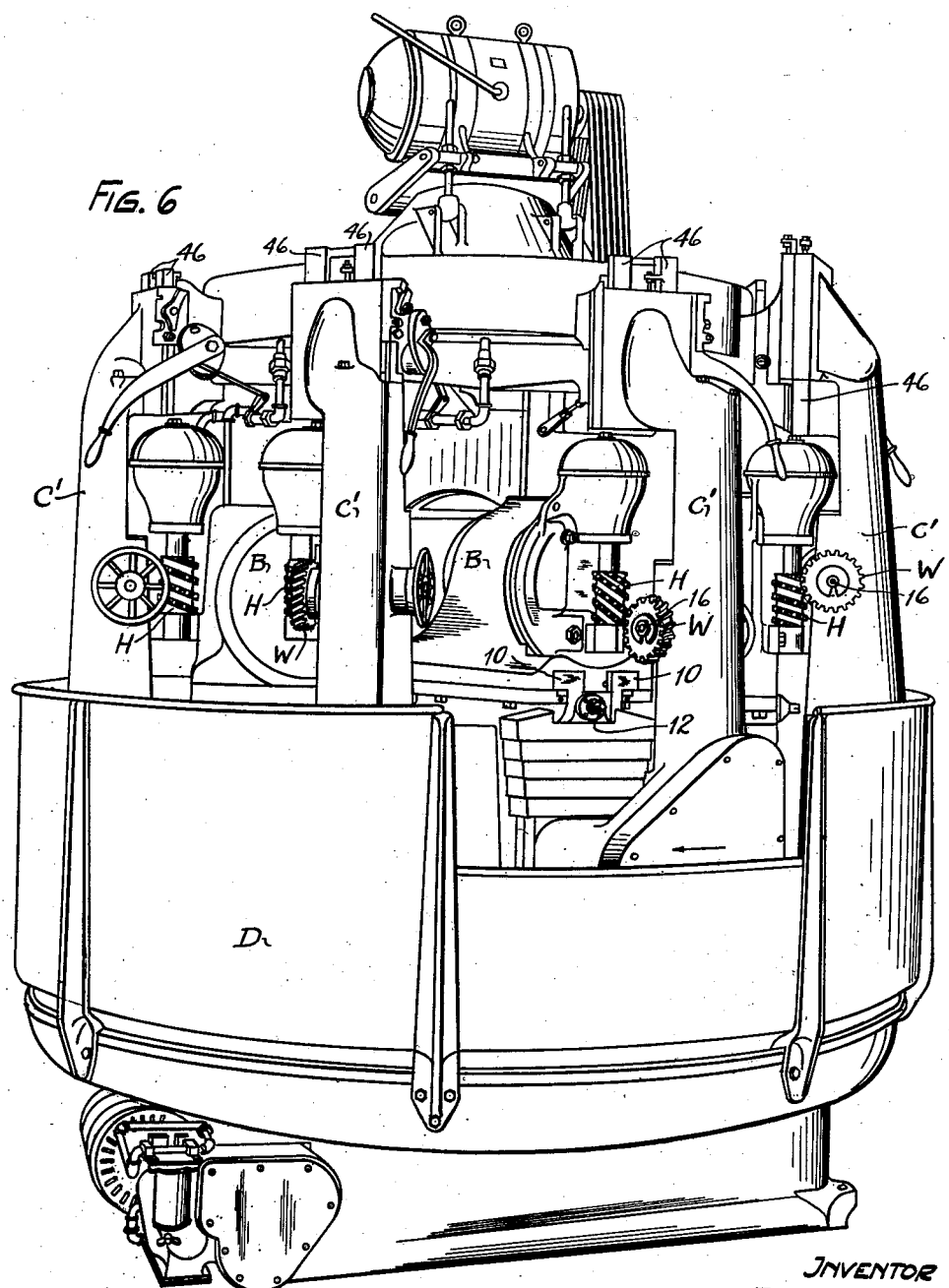

Patented Feb. 18, 1941

2,231,865

UNITED STATES PATENT OFFICE 2,231,865

HOBBING MACHINE

Frank H. Adams, Cleveland Heights, Ohio, assignor to The Cleveland Hobbing Machine Company, Cleveland, Ohio, a corporation of Ohio Application June 5, 1934, Serial No. 729,117

6 Claims. (Cl. 90—4)

The present invention relates to a gear cutting machine and more particularly to a machine for cutting worm wheels. Heretofore in the art worm wheels have for the most part been cut on more or less conventional milling machines, and an object of the present invention is the provision of a novel machine particularly adapted for the production of worm gears in large quantities.

Another object of the invention is the provision of a novel machine, either of the single or multiple spindle construction for cutting gears, which will be simple and rigid in construction and economical to manufacture and operate.

Another object of the invention is the provision of a metal working machine tool comprising novel feed and control mechanism for effecting the relative feed movement between the tool and the work.

The invention resides in certain novel features and details of construction, and combinations and arrangements of parts, and further objects and advantages thereof will be apparent to those skilled in the art to which it pertains, from the following description of the preferred embodiment thereof described with reference to the accompanying drawings, in which Fig. 1 is a perspective view of a gear cutting machine embodying the present invention;

Fig. 3 is a vertical section on the line 3—3 of Fig. 2;

Fig. 4 is a section on the line 4—4 of Fig. 3;

Fig. 5 is a wiring diagram of the control circuit; and

Fig. 6 is a perspective view of a multiple spindle turret type of machine embodying the present invention.

Similar reference characters designate corresponding parts throughout the several views of the drawings.

Figure 1:
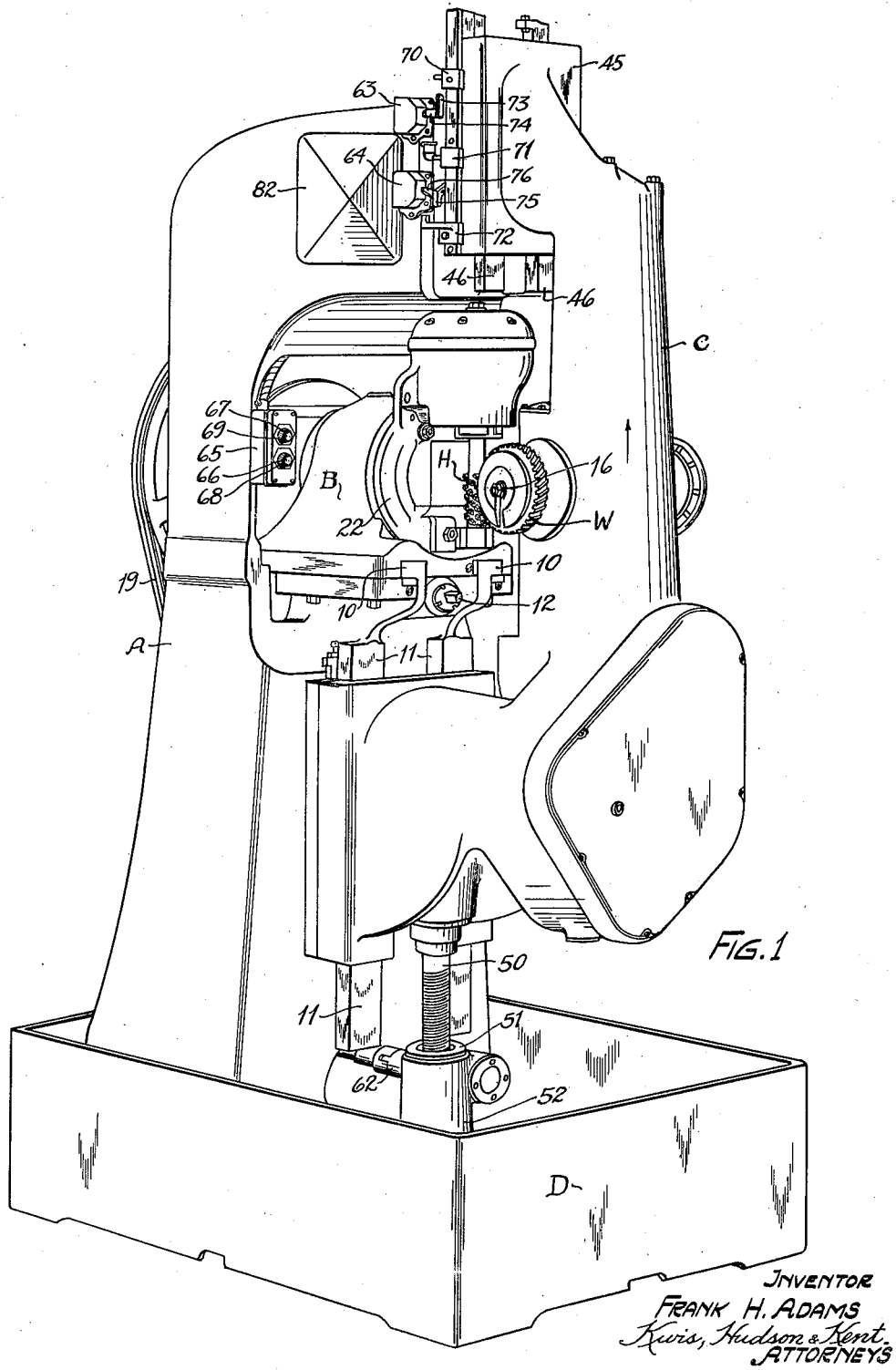

While the preferred embodiment of the invention is illustrated as a single spindle machine, it is to be understood that the invention is equally applicable to multiple spindle machines, and a multiple spindle machine embodying the present invention is illustrated in the drawings and will be hereinafter referred to.

Figure 2:
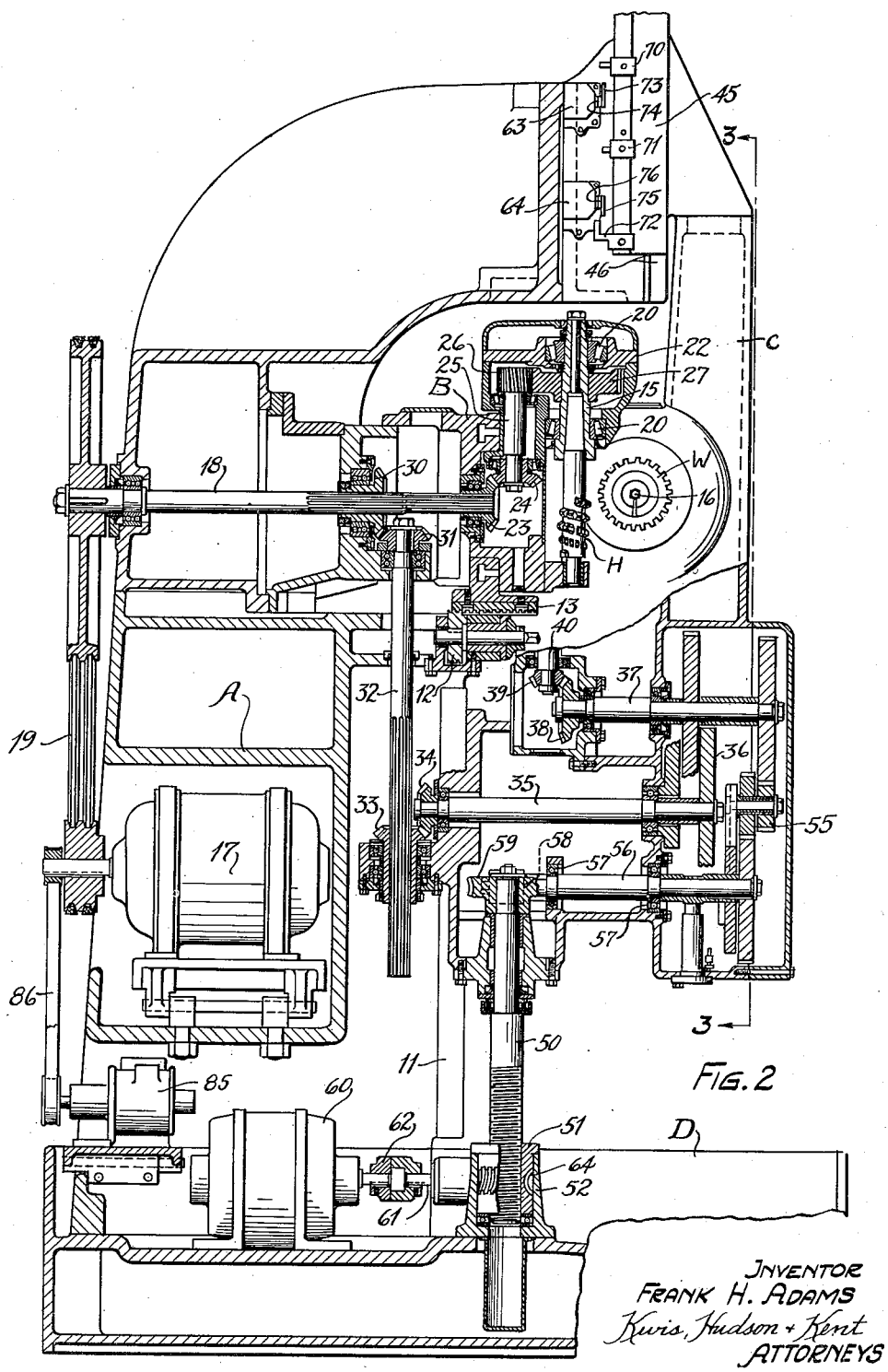
Fig. 2 is a section through the machine shown in Fig. 1, taken through the center of the machine approximately on the line 2—2 of Fig. 3.

Referring to the machine illustrated in Figs. 1 to 5 inclusive, the reference character A designates the frame of the machine generally, the reference character B the tool or hob head, and the reference character C the work head. The frame A is supported in a rectangular base D provided for the reception of oil and chips etc. The rectangular shape of the base D is so designed that a plurality of machines may be gauged close together with a minimum requirement of floor space. Where a plurality of the single spindle machines are so employed they may be synchronized and taken care of by a single operative, if desired.

As illustrated, the tool or hob head B and the work head C are slidably supported on horizontal ways 10 and vertical ways 11, respectively, formed integral with the frame A. The tool or hob head B is adjustable along the ways 10 by means of a screw 12 rotatably supported by the frame A between the ways 10 and having threaded or meshing engagement with a rack 13 on the tool head B. The work head C is moved in a vertical direction along the ways 11, by mechanism hereinafter referred to, to produce the relative feed movement between the tool and the work.

The tool and work spindles 15 and 16, respectively, rotatably supported in the tool and work heads B and C, respectively, are driven in predetermined timed relation by means of an electric motor 17 supported in the frame A, through a common shaft 18 operatively connected to the motor by means of a flexible drive 19. The tool spindle 15 rotatably supported in a member 22 on the hob head B by suitable anti-friction bearings 20, carries a tapered hob H. The member 22 is adjustable about the axis of the shaft 18 to position the hob at any desired angle with reference to the work. The tool spindle 15 is driven from the shaft 18 through a bevel gear 23 splined to the shaft 18, in mesh with a bevel gear 24 fixed to a stud shaft 25 rotatably supported in the member 22, and spiral gears 26 and 27, the latter of which is keyed to the tool spindle 15 and is extremely heavy serving as a flywheel for the tool spindle. The splined arrangement of the gear 23 on the shaft 18 permits adjustment of the tool head B along the ways 10, to and from the work.

The work spindle 16 is in horizontal position and supports the work W in the form of a worm wheel gear block, in such relationship to the tool spindle 15 that the work is moved past the tool as the work head C is moved along the ways 11. The work spindle 16 is of more or less conventional construction and is rotatably supported by suitable antifriction bearings 30 in the work head C. The work spindle 16 is driven from the shaft 18 through miter gears 30 and 31, vertical shaft 32, miter gears 33 and 34, horizontal shaft 35, change gears designated in general as 36, horizontal shaft 37, miter gears 38 and 39, vertical shaft 40, worm 41, and worm wheel 42. The bevel gear 33 is rotatably supported by the work head C and splined on the shaft 32 to permit the vertical movement of the work head previously referred to. The change gears 36 are provided for the purpose of permitting various spindle speeds.

The upper end 45 of the work head C is slidably supported on guide ways 46 formed integral with an upper extension of the frame A to provide a rigid construction. The work head C is moved vertically to produce the relative feed movement between the tool and the work by means of a lead screw 50 having threaded engagement with a nut 51, rotatably supported in a bracket 52 fixed to the base D. The lead screw 50 is rotatably supported in the work head C and is driven at a slow speed to effect the required feeding movement from the shaft 37, through change gears designated in general by the reference character 55, a horizontal shaft 56 rotatably supported in the work head C by anti-friction bearings 57, and a worm 58 fixed to the end of the shaft 57 and in mesh with a worm wheel 59 keyed to the upper end of the lead screw. The nut 51 which, as stated, is rotatably supported in a bracket 52 and is driven at a high rate of speed by means of an electric motor 60, positioned within the frame A, through shaft 61 secured to the armature shaft by means of a coupling 62, worm 63 fixed to the shaft 61 and in mesh with a wormwheel 64 formed in the circumference of the nut 51, to rapidly return the work head to its starting position and/or quickly bring the work up to the tool. The worm and worm wheel 63 and 64, respectively, are of the self-locking type and prevent relative rotation of the nut 51 with reference to bracket 52 during the feeding operation.

Preferably the motors 17 and 60 are three phase alternating current motors and the motor 60 is reversible. The motors are controlled by upper and lower limit switches 63 and 64, respectively, and the start-stop push button switch 65, both the start and stop buttons 66 and 67, respectively, of which are provided with ferrules 68 and 69, respectively, which limit the movement thereof. The start button is normally in the out position, i. e., the position shown in the wiring diagram, see Fig. 5, but may be set in the neutral position shown in dotted lines by the ferrule 68, and the stop button which is normally closed may be set in the open position by the ferrule 69. The limit switches 63 and 64 are operated and controlled by adjustable stops 70, 71 and 72, carried by the work head C, which engage the arms 73, 74 and 75, 76 of bell crank levers on the switches 63 and 64, respectively.

The motor 17 is connected to and from the supply lines $L^1$, $L^2$, $L^3$ through the medium of a solenoid operated circuit breaker panel 79, the operating solenoid and hold-in circuit of which are indicated at c and c' respectively. The motor 60 is connected to and from the supply lines through the reversible circuit breaker panel 80, the operating solenoids and their respective holding-in circuits of which are designated as u, u' and d, d'. The reference character u designates the solenoid which closes the circuit to the motor 60 to operate the same in a direction to raise the work head C, and the solenoid which closes the circuit to motor 60 to lower the work head is designated by the reference character d. The leads to the motor 17 are designated as $T^1$, $T^2$, $T^3$, and to the motor 60 as $T^{1'}$, $T^{2'}$, $T^{3'}$. The reference character 81 designates a contact relay mounted on the panel 79. The panels 76 and 80 are enclosed in the head of the frame A behind the covers 82 on opposite sides of the frame.

The operation of the machine is as follows:

With the machine at rest and a work head in the lower position the electrical circuit is as shown in the wiring diagram. Assuming that a gear blank has been secured in position on the work spindle 16, the start button 66 is pressed by the operator, closing the circuit to the contact relay 81 which in turn closes the circuit to the solenoid u, energizing the motor 60 to quickly raise the work head and bring the work up to the tool. When the start button 66 is released the circuit to the contact relay 81 is closed through the holding in circuit u' which is now energized. Thereafter the relay maintains its own circuit energized. The position of the stop 70 is such that as the head C rises it engages the upstanding arm 73 of the limit switch 63 and moves the limit switch to its lower position just prior to the engagement of the work with the hob. This operation of the limit switch 63 opens the circuit to solenoid u, and closes the circuit to solenoid c, through the contacts of the contact relay 81 stopping the motor 60 and starting the motor 17. The holding-in circuit c' retains the circuit to the motor until the work has traveled past the hob and the cutting operation has been completed, at which time the stop 72 engages the arm 76 and trips the limit switch 64, opening the circuit to the motor 17 and resetting the circuit to the solenoid d so that the motor 60 will be operated to quickly lower the work head C when the start button 66 is again pressed.

The work head C remains at rest in the up position until the finished blank has been removed, after which the start button is pressed by the operator to lower the work head. As the work head C is lowered the stop 70 engages the lever 74 and returns the limit switch 63 to its starting or initial position without interrupting the circuit to the motor 60. As the work head C approaches its lower limit of movement, the stop 71 engages the lever 75, returning the limit switch 64 to its initial or starting position, and interrupting the circuit to the motor 60. After a new blank has been replaced on the work spindle, the cycle of operation is repeated. The machine may be stopped at any time by merely pressing the stop button, after which it can only be started by pressing the start button.

If desired, the stop button 67 can be set in an open position by turning the ferrule 69 so that the machine will not start upon movement of the start button 66. This construction is particularly important when making repairs on the machine, etc. The start button 66 can likewise be set in a neutral position by turning the ferrule 68, in which event the work head C will stop at the end of its rapid up movement without automatically starting the motor 17. A pump 85 secured in the base of the frame A and connected to the shaft of the motor 17 by a belt 86 supplies cutting fluid to the hob during the cutting operation.

An embodiment of the present invention in a multiple spindle machine is shown in Fig. 7 of the drawings. The machine illustrated in this figure is the same as that illustrated in the copending application of Frank H. Adams, et al., Serial No. 623,830, filed July 21, 1932, with the exception that work heads C' similar in construction to the work head described with reference to Figs. 1 to 5 inclusive of the present application have been substituted for the work heads illustrated in the prior application. The mechanisms for controlling the movement of the work head, etc., are the same as those shown in the prior application.

The preferred embodiments of the invention have been illustrated and described, but I do not wish to be limited to the particular construction shown which may be varied within the scope of this invention. It is my intention to cover any and all variations, adaptations, or uses thereof as come within the knowledge or customary practice in the art to which the invention appertains, and I particularly point out and claim as my invention the following:

1. A hobbing machine of the character described comprising a frame, a work head slidably supported by said frame, a horizontal work spindle rotatably supported by said work head, a tool head slidably supported by said frame, a vertical tool spindle rotatably supported by said tool head, means for rotating said spindles at predetermined relative speeds, means for moving said work head in a vertical plane, said last mentioned means comprising a lead screw and a cooperating nut, and means for producing relative rotation between said lead screw and nut in predetermined timed relation to the rotation of said spindles.

2. A gear cutting machine of the character described comprising a frame provided with a plurality of vertically spaced vertical guideways and a horizontal guideway therebetween, a work head slidably supported by said vertically spaced guideways, a tool head slidably supported by said horizontal guideway, a horizontal work spindle rotatably supported by said work head, a tool spindle supported by said tool head, means comprising a lead screw and a cooperating nut for moving said work head along said vertical guideways, an electric motor for rotating said spindles and for producing a relative rotation between said lead screw and said nut at predetermined relative speeds, a second electric motor for producing relative rotation between said lead screw and said nut at a different speed, means for closing the circuit to said second electric motor, and means for automatically opening the circuit to said second electric motor at a predetermined position of said work head.

3. A hobbing machine of the character described comprising a frame provided with a plurality of vertically spaced vertical guideways and a horizontal guideway therebetween, a work head slidably supported by said vertically spaced guideways, a tool head slidably supported by said horizontal guideway, a horizontal work spindle rotatably supported by said work head, a member supported by said tool head for rotation about a horizontal axis, a tool spindle rotatably supported by said member, means for rotating said spindles at predetermined relative speeds, a lead screw rotatably supported by said work head, a nut having threaded engagement with said lead screw supported by said frame, and means for rotating said lead screw in predetermined timed relation to the rotation of said spindles.

4. A hobbing machine of the character described comprising a frame provided with a plurality of vertically spaced vertical guideways and a horizontal guideway therebetween, a work head slidably supported by said vertically spaced guideways, a tool head slidably supported by said horizontal guideway, a horizontal work spindle rotatably supported by said work head, a member rotatably supported by said tool head for movement about a horizontal axis, a tool spindle rotatably supported by said member, a lead screw rotatably supported in said work head, a cooperating nut rotatably supported in said frame, an electric motor for rotating said spindles and said lead screw at predetermined relative speeds, a second electric motor for rotating said nut, means for closing the circuit to the second mentioned electric motor, and means controlled by the movement of said work head for automatically closing the circuit to the first mentioned electric motor and opening the circuit to the second mentioned electric motor at a predetermined point in the movement of said work head relative to said frame.

5. A hobbing machine of the character described comprising a frame provided with a plurality of vertically spaced vertical guideways and a horizontal guideway therebetween, a hob head supported on said horizontal guideway, a substantially vertical hob spindle carried by said hob head, a workhead slidably supported by said vertically spaced guideways and comprising a column spanning the space between said spaced guideways, a substantially horizontal work spindle rotatably supported in said column, means for rotating said spindles in timed relation, and means for moving said work head vertically along said spaced guideways.

6. A hobbing machine of the character described comprising a frame provided with a plurality of vertically spaced vertical guideways and a horizontal guideway therebetween, a hob head supported on said horizontal guideway, a substantially vertical hob spindle carried by said hob head, a workhead slidably supported by said vertically spaced guideways and comprising a column spanning the space between said spaced guideways, a substantially horizontal work spindle rotatably supported in said column, a lead screw and a cooperating nut operatively connected to said frame and said work head for moving the latter vertically along said spaced guideways, and means for producing relative rotation between said lead screw and said nut in timed relation to the rotation of said spindles.

FRANK H. ADAMS.